United States Patent
Dorneich et al.

(10) Patent No.: US 8,928,498 B2
(45) Date of Patent: Jan. 6, 2015

(54) WORKLOAD MANAGEMENT SYSTEM AND METHOD

(75) Inventors: Michael Christian Dorneich, Saint Paul, MN (US); William Rogers, Minneapolis, MN (US); Stephen Whitlow, St. Louis Park, MN (US); Chris Hamblin, League City, TX (US); Claudia Keinrath, Graz (AT)

(73) Assignee: Honeywell International Inc, Morristown, NJ (US)

( * ) Notice: Subject to any disclaimer, the term of this patent is extended or adjusted under 35 U.S.C. 154(b) by 649 days.

(21) Appl. No.: 13/173,760

(22) Filed: Jun. 30, 2011

(65) Prior Publication Data
US 2012/0075119 A1 Mar. 29, 2012

Related U.S. Application Data (60) Provisional application No. 61/386,784, filed on Sep. 27, 2010.

(51) Int. Cl.
*G08B 21/00* (2006.01)
(52) U.S. Cl.
USPC ............... 340/945; 340/963; 340/971; 701/3
(58) Field of Classification Search
USPC ............ 340/945, 963, 964, 971; 701/2, 3, 14, 701/29, 120, 121; 244/180, 189
See application file for complete search history.

(56) References Cited

U.S. PATENT DOCUMENTS

| | | | |
|---|---|---|---|
| 4,224,669 A * | 9/1980 | Brame | 701/8 |
| 5,243,339 A | 9/1993 | Graham et al. | |
| 6,909,947 B2 | 6/2005 | Douros et al. | |
| 7,269,504 B2 | 9/2007 | Gardner et al. | |
| 7,271,740 B2 | 9/2007 | Fischer | |
| 7,384,394 B2 | 6/2008 | Hursh et al. | |
| 7,437,220 B2 | 10/2008 | Stefani | |
| 7,454,313 B2 | 11/2008 | Whitlow et al. | |
| 7,639,148 B2 | 12/2009 | Victor | |
| 2009/0254404 A1 | 10/2009 | Eggenberger et al. | |
| 2010/0161157 A1 | 6/2010 | Guilley et al. | |
| 2010/0174424 A1* | 7/2010 | Cornell et al. | 701/9 |
| 2012/0075122 A1* | 3/2012 | Whitlow et al. | 340/963 |
| 2012/0078445 A1* | 3/2012 | Krupansky et al. | 701/3 |
| 2012/0078448 A1* | 3/2012 | Dorneich et al. | 701/3 |

OTHER PUBLICATIONS

EP Office Action for 11 182 263.1, dated May 23, 2012.
EP Search report, EP 11182263.1-2221/2434443 dated Apr. 27, 2012.

* cited by examiner

*Primary Examiner* — Hung T. Nguyen
(74) *Attorney, Agent, or Firm* — Ingrassia Fisher & Lorenz, P.C.

(57) ABSTRACT

A system and method are provided for facilitating workload management. The system processes first sensor data to estimate the current cognitive state of a first person, and processes second sensor data to estimate the current cognitive state of a second person. Information representative of the estimates of the current cognitive states of the first person and the second person is simultaneously rendered on a display device.

5 Claims, 4 Drawing Sheets

|  | PILOT 1 | |
|---|---|---|
|  | HI | NOM |
| PILOT 2  HI | X | ALERT |
| NOM | ALERT | X |

WORKLOAD MANAGEMENT SYSTEM AND METHOD

PRIORITY CLAIMS

This application claims the benefit of U.S. Provisional Application No. 61/386,784 filed Sep. 27, 2010.

TECHNICAL FIELD

The present invention generally relates to aircraft flight crew workload sharing, and more particularly relates to a system and method for objectively determining the cognitive states of a multi-pilot crew and providing management solutions for sharing the workload amongst the crew.

BACKGROUND

Many aircraft include two-pilot flight crews. In many instances one pilot is referred to as the "pilot flying" (PF) and the other pilot is referred to as the "pilot monitoring" (PM). No matter the particular nomenclature used, the relative workloads of the PF and the PM are often asymmetric. Likewise, the experience levels of the two pilots may be asymmetric. There are instances in which the PM could reduce the workload of the PF, or vice versa, by assuming greater task responsibilities during high workload periods. Some airlines have instituted policies to alleviate the potential impact associated with asymmetric workloads. Typically, such policies are not automated and rely on explicit, albeit subjective, criteria to determine when one pilot should offload some tasks to the other.

Although the above-mentioned policies are workable and generally provide desired results, there is room for improvement. This is because there is evidence that some pilots, due to airline culture, authority hierarchies, cultural differences, personality, or other factors, may be reluctant to acknowledge that they are overloaded or fatigued. Moreover, pilots may simply not notice that the other pilot has become overloaded. Thus, the pilots forego a reallocation of tasks that could maintain a more optimal workload balance between the pilots.

Hence, there is a need for a system and method to objectively determine the workload and fatigue states of multi-pilot crews, notify the pilots, and recommend task sharing and/or automate lower order tasks, as needed. The present invention addresses at least this need.

Furthermore, other desirable features and characteristics of the present invention will become apparent from the subsequent detailed description, taken in conjunction with the accompanying drawings and this background.

BRIEF SUMMARY

In one embodiment, a method for facilitating workload management among a plurality of persons includes processing first sensor data to estimate current cognitive state of a first person, processing second sensor data to estimate current cognitive state of a second person, and simultaneously rendering, on a display device, information representative of the estimates of the current cognitive states of the first person and the second person.

In another embodiment, a workload management system includes a display device, a first plurality of cognitive sensors, a second plurality of cognitive sensors, and a processor. The display device is configured to render images. Each of the first plurality of cognitive sensors is configured to sense a parameter representative of first cognitive level and supply first sensor data representative thereof. Each of the second plurality of cognitive sensors is configured to sense a parameter representative of second cognitive level and supply second sensor data representative thereof. The processor is in operable communication with the display device and is coupled to receive the first sensor data and the second sensor data. The processor is configured, upon receipt of the first and second sensor data, to estimate current cognitive states of a first person and of a second person and command the display device to simultaneously render information representative of the estimates of the current cognitive states of the first person and the second person.

In yet another embodiment, a flight crew workload management system includes a display device, a first plurality of workload sensors, a second plurality of workload sensors, an aircraft mission data source, and a processor. The display device is configured to render images. Each of the first plurality of workload sensors is configured to sense a parameter representative of first pilot workload level and supply first sensor data representative thereof. Each of the second plurality of workload sensors is configured to sense a parameter representative of second pilot workload level and supply second sensor data representative thereof. The aircraft mission data source is configured to supply data representative of current aircraft mission. The processor is in operable communication with the display device and is coupled to receive the first sensor data, the second sensor data, and the aircraft mission data. The processor is configured, upon receipt of these data, to estimate current workload states of a first pilot and of a second pilot, estimate current task loads of the first and second pilots, estimate imminent task loading of the first and second pilot, compare the estimates of the current task loads of the first and second pilots, compare the estimates of the imminent task loading of the first and second pilots, selectively generate task sharing recommendations based on the comparison of the estimates of the current task loads and the comparison of the imminent task loadings, and command the display device to simultaneously render information representative of the estimates of the current workload states of the first pilot and the second pilot, and the selectively generated task sharing recommendations.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description. In this regard, although systems and methods are described herein in the context of an aircraft and an aircraft flight deck, the systems and methods could be implemented in numerous other end-use environments.

Figure 1:
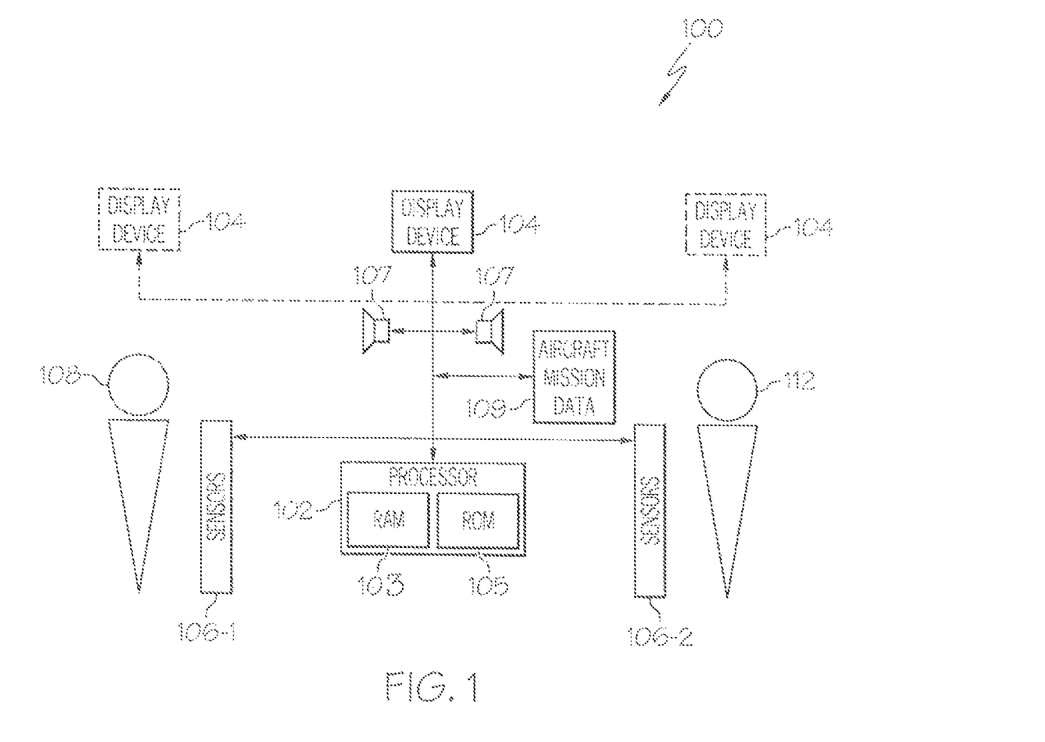
FIG. 1 depicts a functional block diagram of an example embodiment of a flight crew workload management system.

FIG. 1 depicts a functional block diagram of an example embodiment of a flight crew workload management system 100. The depicted system 100 includes at least a processor 102, a display device 104, an aircraft mission data source 109, and a plurality of sensors 106, which include a plurality of pilot sensors 106-1, and a plurality of co-pilot sensors 106-2. The processor 102 is in operable communication with the display device 104 and the sensors 106. The processor 102 is coupled to receive various types of data from the sensors 106, and may be implemented using any one (or a plurality) of numerous known general-purpose microprocessors or application specific processor(s) that operates in response to program instructions. In the depicted embodiment, the processor 102 includes on-board RAM (random access memory) 103, and on-board ROM (read only memory) 105. The program instructions that control the processor 102 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 102 may be implemented using various other circuits, not just a programmable processor. For example, digital logic circuits and analog signal processing circuits could also be used. In this respect, the processor 102 may include or cooperate with any number of software programs (e.g., avionics display programs) or instructions designed to carry out various methods, process tasks, calculations, and control/display functions described below.

The display device 104 is used to display various images and data, in a graphic, iconic, and a textual format, and to supply visual feedback to the pilot 108 and the co-pilot 112. It will be appreciated that the display device 104 may be implemented using any one of numerous known displays suitable for rendering graphic, iconic, and/or text data in a format viewable by the pilot 108 and co-pilot 112. Non-limiting examples of such displays include various cathode ray tube (CRT) displays, and various flat panel displays, such as various types of LCD (liquid crystal display), TFT (thin film transistor) displays, and OLED (organic light emitting diode) displays. The display may additionally be based on a panel mounted display, a HUD projection, or any known technology. In an exemplary embodiment, display device 104 includes a panel display. It is further noted that the system 100 could be implemented with more than one display device 104. For example, the system 100 could be implemented with two or more display devices 104.

No matter the number or particular type of display that is used to implement the display device 104, it was noted above that the processor 102 is responsive to the various data it receives to render various images on the display device 104. The images that the processor 102 renders on the display device 104 will depend, for example, on the type of display being implemented. For example, the display device 104 may implement one or more of a multi-function display (MFD), a three-dimensional MFD, a primary flight display (PFD), a synthetic vision system (SVS) display, a vertical situation display (VSD), a horizontal situation indicator (HSI), a traffic awareness and avoidance system (TAAS) display, a three-dimensional TAAS display, just to name a few. Moreover, and as FIG. 1 depicts in phantom, the system 100 may be implemented with multiple display devices 104, each of which may implement one or more these different, non-limiting displays. The display device 104 may also be implemented in an electronic flight bag (EFB) and, in some instance, some or all of the system 100 may be implemented in an EFB.

The aircraft mission data source 109 may comprise one or more data source of various types, but in the depicted embodiment it comprises various avionics systems. Some non-limiting examples of avionics systems that may comprise the aircraft mission data source 109 include communication systems, navigation and guidance systems, flight management systems, sensors and indicators, weather systems, and various user interfaces to assist the pilot 108 and co-pilot 112 in implementing control, monitoring, communication, and navigation functions of the aircraft.

The system 100 may also include one or more audio output devices 107, which may be variously implemented. No matter the specific implementation, each audio output device 107 is preferably in operable communication with the processor 102. The processor 102, or other non-depicted circuits or devices, supplies analog audio signals to the output devices 107. The audio devices 107, in response to the analog audio signals, generate audible sounds. The audible sounds may include speech (actual or synthetic) or generic sounds or tones associated with alerts and notifications.

The sensors 106, which may be variously implemented, are configured to sense and supply physiological data, contextual data, and/or various other relevant data to the processor 102. The sensors 106 may be located on the body and/or clothing of the pilot 108 and co-pilot 112, embedded in the flight deck seats, and/or on one or more other devices (e.g., helmet, eye wear) worn by the pilot 108 and co-pilot 112. Alternatively, the sensors 106 may be disposed nearby the pilot 108 and co-pilot 112.

It will be appreciated that the number and type of sensors 106 may vary. Some non-limiting examples of suitable physiological sensors 106 include an electroencephalogram (EEG) sensor, an electrocardiogram (ECG) sensor, an electrooculogram (EOG) sensor, an impedance pneumogram (ZPG) sensor, a galvanic skin response (GSR) sensor, a blood volume pulse (BVP) sensor, a respiration sensor, an electromyogram (EMG) sensor, a pupilometry sensor, a visual scanning sensor, a blood oxygenation sensor, a blood pressure sensor, a skin and core body temperature sensor, a near-infrared optical brain imaging sensor, or any other device that can sense physiological changes in the pilot.

The EEG sensors monitor the pilot's and co-pilot's brain wave activity by sensing electrical potential at the scalp. Measurements by the EEG sensors are categorized into frequency bands, including delta, theta, alpha, and beta. For example, the delta band ranging from 1-4 Hz indicates a state of unconsciousness, the theta band ranging from 4-8 Hz indicates a state of daydreaming, the alpha band ranging from 8-13 Hz indicates an alert, but not mentally busy state, and the beta band ranging from 13-30 Hz indicates a state of higher thought process. Other frequency bands are possible. Based on the location of the EEG sensors, and the dominant frequencies detected, EEG data may help evaluate the type and amount of mental activity of the pilot 108 and co-pilot 112.

For example, if there are significant brain waves measured in the frontal brain, the pilot 108 or co-pilot 112 may be actively manipulating information within their working memory. As a result, the EEG sensors may be used to measure the cognitive state of the pilot 108 and co-pilot 112.

Other physiological sensors mentioned above include ECG sensors, EOG sensors, ZPG sensors, GSR sensors, pupilometry sensors, visual scanning sensors, blood oxygenation sensors, BVP sensors, EMG sensors, blood pressure sensors, and near-infrared optical brain imaging sensors. The ECG sensors measure heart rate by detecting electrical activity of the heart muscle. The EOG sensors measure eye movement by detecting electrical changes between the front and back of the eye as the eye moves. The ZPG sensors (or other type of respiration sensors) measure lung capacity and can be used to determine whether the pilot 108 or co-pilot 112 is having difficulty breathing. The GSR sensors measure changes in conductivity of the skin caused by sweating and saturation of skin ducts prior to sweating. The pupilometry sensors measure pupil dilation to determine the level of engagement or interest in a task, or cognitive load of a task. The visual scanning sensors measure scanning behavior and dwell time to provide insight into visual attention. The blood oxygenation sensors sense oxygen levels in the blood. The BVP sensors measure heart rate by detecting changes in blood volume at a given location of the body. The EMG sensors measure currents associated with muscle action. The near-infrared optical brain imaging sensors measure brain function.

The sensors 106 may additionally include an accelerometer, an eye tracker, or any other device that can sense contextual data. The devices may be commercial off-the-shelf devices or custom designed. The accelerometers, if included, measure the rate at which an object is moving, the acoustic sensors, if included, measure the loudness and frequency of ambient sounds, and the eye trackers, if included, measure pupilometry and/or visual scanning behavior. Data from the accelerometers may be used to measure head movement such as yaw, pitch, and roll. Data from the eye trackers may be used to infer cognitive state from pupil dilation response and to infer visual attention indices from dwell time and scanning patterns.

No matter the specific number and type of sensors 106 used, each sensor 106 supplies data representative of the measured stimuli to the processor 102. It will be appreciated that the data may be transmitted to the processor 102 wirelessly or via hard-wired connections, and that the data may be modified, prior to transmission, to format the data as needed. The processor 102, upon receipt of the sensor data, assesses the individual cognitive (e.g., workload and/or fatigue state) of both the pilot 108 and the co-pilot 112. It will be appreciated that the pilot and co-pilot cognitive states may be assessed using any one of numerous known methods. An example of one particular methodology is disclosed in U.S. Pat. No. 7,454,313, entitled "Hierarchical Workload Monitoring for Optimal Subordinate Tasking," which is assigned to the assignee of the instant invention.

Before proceeding further, it is noted that cognitive state may also be assessed from secondary (i.e. non-direct) sources, such as tracking response times to stimuli presentation (e.g. alerts) or performance on tasks. Moreover, the processor 102 that is configured to determine cognitive states may be the same or differ from the processor that implements various other functions described herein. Although the same numeral is used to reference the processor that implements these additional functions, it will be appreciated that the processor may be one or more additional processors.

The processor 102 may, in some embodiments, additionally be configured to estimate current and pending (or imminent) task loads of the pilot 108 and co-pilot 112. These estimates may be derived from tracking pilot 108 and co-pilot 112 interaction with system 100, directly sensing the task loads of the pilot 108 and co-pilot 112 (e.g., via sensors 106), and/or from aircraft mission data supplied from the aircraft mission data source 109. For example, based on rough timing, system interaction record, and/or spatial location, the processor can determine a rough estimate of where the current mission is on some nominal mission timeline. By reasoning on current and future task load, the processor can generate task sharing recommendations for the pilot 108 and co-pilot 112 that are responsive to the current task context.

The processor 102 may, at least in some embodiments, additionally be configured to compare the cognitive estimates for the pilot 108 and co-pilot 112 and, based on analyses of the pilot 108 and co-pilot 112 current and pending (or imminent) tasks, provide suitable feedback. This feedback, which is preferably rendered on the display device 104, includes information regarding the individual cognitive states of the pilot 108 and co-pilot 112, and any recommendations for modifying task assignments. For example, if the processor 102 determines that the pilot 108 (or co-pilot 112) has a lower cognitive state (e.g., lower workload and/or lower fatigue state) than the co-pilot 112 (or pilot 108), the displayed feedback may include a recommendation that the co-pilot 112 (or pilot 108) perform specified tasks that are normally performed by the pilot 108 (or co-pilot 112). In some instances this recommendation may depend upon whether the crew member (pilot or co-pilot) that is assessed to have a higher cognitive state has more tasks to perform than the crew member that is assessed to have lower cognitive state. In some embodiments, the feedback may simply be an alert (visual, auditory, or both) of the other pilot's relative workload.

In preferred embodiments, the cognitive state of each pilot 108, 112 is visible both to themselves and each other, so that each pilot 108, 112 will know when the other pilot's cognitive state is high. Preferably, the display 104 that communicates the cognitive state of the pilots 108, 112 is visible to both pilots 108, 112, and supports "at a glance" recognition of the cognitive states of both pilots. In some embodiments, the processor 102 is configured to command the display device 104 to render cognitive state trends and/or history information. As such, the system 100 may additionally include a memory storage device 103 for storing at least a portion of the cognitive state data. The memory storage device 103 may be integral to the processor 102 or separate therefrom.

Figure 2:
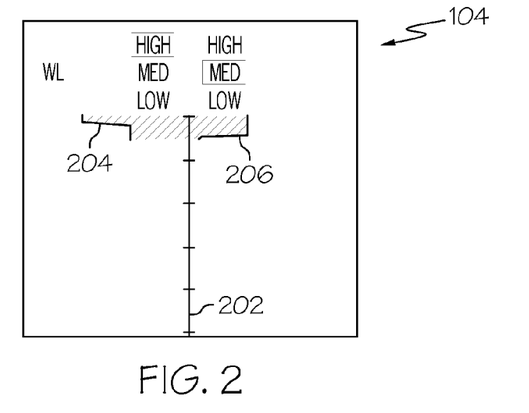
FIGS. 2-4 depict examples of how a display device may simultaneously render the workload of two pilots.
Figure 3:
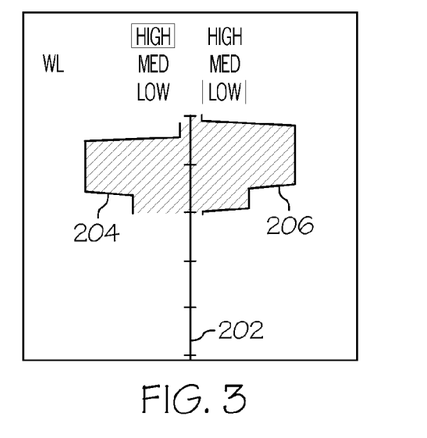
Figure 4:
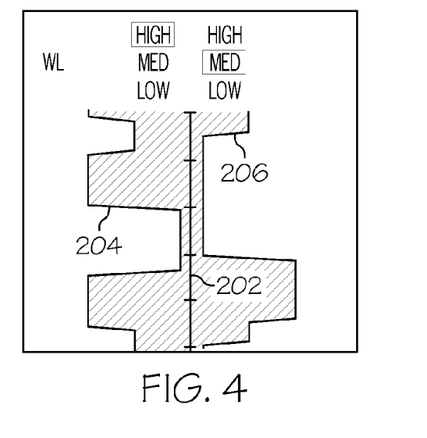

The manner in which the cognitive state of each pilot 108, 112 is rendered on the display device may vary. In one embodiment, which is depicted in FIGS. 2-4, the cognitive state of each pilot 108, 112 is simultaneously rendered on either side of a timeline 202. In particular, the cognitive state 204 of the pilot 108 is rendered as a graphic to the left of the timeline 202, and the cognitive state 206 of the co-pilot 112 is rendered as a graphic to the right of the timeline 202. In addition to rendering the cognitive states graphically, a textual representation of the pilot 108, 112 workloads is also rendered. Thus, in FIG. 2, the cognitive state of the pilot 108 is estimated to be "HIGH," whereas the cognitive state of the co-pilot 112 is estimated to be "MED" (or medium). However, as FIGS. 3 and 4 depict, the cognitive states of the pilot and co-pilot 108, 112 vary as time passes.

It should be noted that the number of cognitive states that are estimated by the processor 102 may vary. For example, in the embodiment depicted in FIGS. 2-4, three cognitive state states are estimated (LOW, MED, HIGH). In other embodiments, less or more than this number of cognitive states may be estimated, and different labels associated with the cognitive states may also be used.

Figure 5:
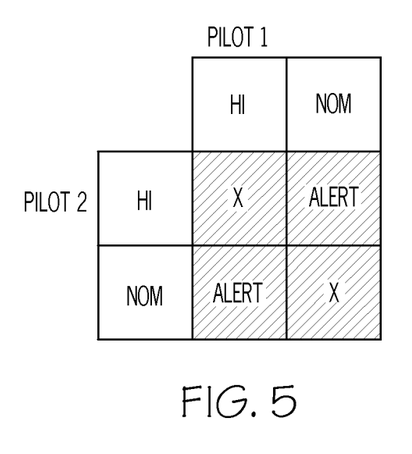
FIG. 5 depicts an example logic diagram for generating alerts.

The processor 102 may implement various rules for generating notifications. For example, as is depicted in FIG. 5, one rule might be: if the cognitive state of the pilot 108 (co-pilot 112) is high while that of the co-pilot 112 (pilot 108) is low (e.g., P1=HIGH AND P2=LOW), then alert the co-pilot 112 (pilot 108) to the cognitive state of the pilot 108 (co-pilot 112). Preferably a smoothing threshold is implemented to determine what percentage of time within a time window the pilot 108 (or co-pilot 112) is in the HIGH state. For example, Pilot=STATE if STATE>% AMOUNT for TIME_WINDOW where STATE=(LOW, MEDIUM, HIGH), % AMOUNT=percentage of data that reads STATE, and TIME_WINDOW=amount of time to assess states to determine overall state (moving window). Such thresholds can be placed in a configuration file to permit rapid testing and specifying different thresholds for different flight crews. An example of another rule might be: If (P1=HIGH and P2=HIGH), DO NOTHING. The rationale for this rule is to not disturb either pilot since they probably cannot do anything to help other pilot.

In sum, the system 100 described herein estimates individual pilot 108 and co-pilot 112 cognitive states, and provides feedback to the pilot 108 and co-pilot 112 regarding their respective cognitive states. The system 100 may also be configured, either selectively or continuously, to determine the current task load for both the pilot 108 and co-pilot 112 and, using task model-based reasoning, generate one or more alerts and/or recommend a task-sharing scheme that would minimally disrupt current operations while balancing workload. The system 100 additionally provides, via the display device 104, awareness of the pilot's and co-pilot's activities and progress.

The general methodology implemented in the flight crew workload management system 100 that was described above is depicted in flowchart form in FIG. 6. For completeness, a description of this method 600 will now be provided. In doing so, it is noted that the parenthetical references refer to like-numbered flowchart blocks.

Figure 6:
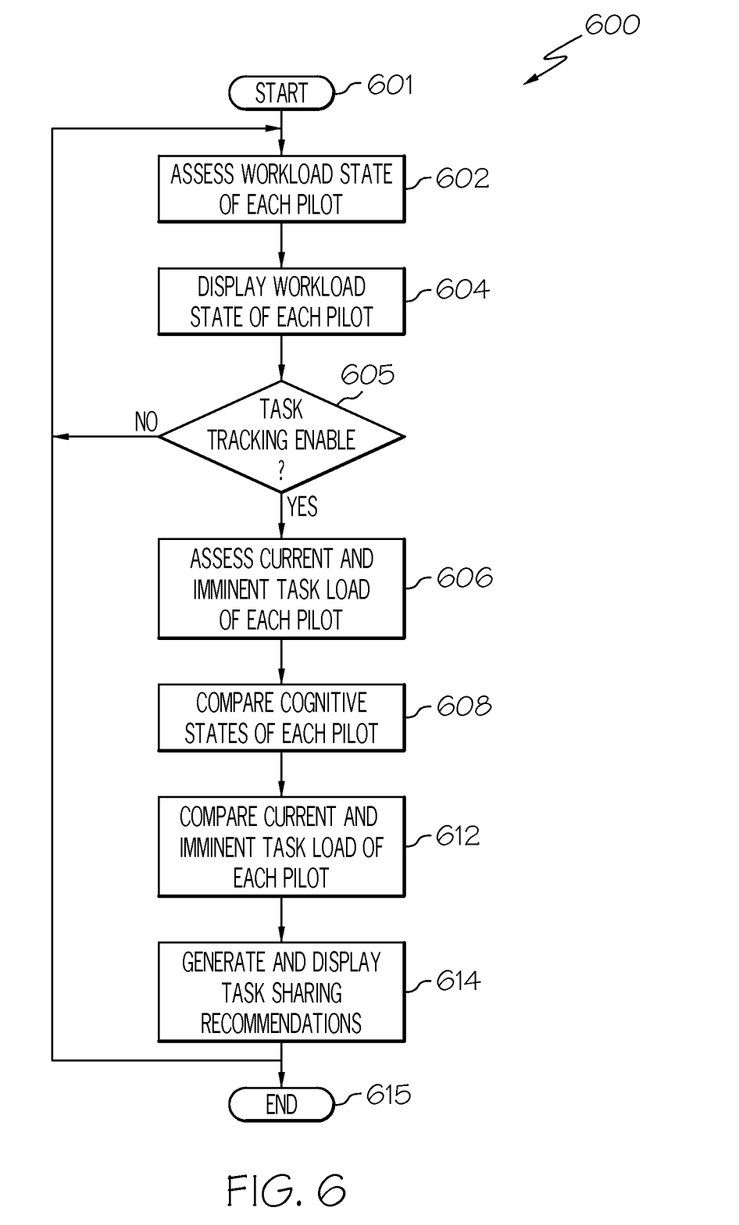
FIG. 6 depicts a process, in flowchart form, that may be implemented in the flight crew workload management system of FIG. 1.

The method 600 begins by assessing the cognitive state of each pilot (602). As noted above, the processor 102 is configured to implement this functionality by processing the sensor data supplied from the sensors 106. The processor 102 is additionally configured to command the display device 104 to render the cognitive states of each pilot 108, 112 (604). As noted above, the system 100 may, at least in some embodiments, be additionally configured, either selectively or automatically, to implement one or more additional functions. The embodiment depicted in FIG. 6 is for a system 100 that is configured to selectively implement these additional functions. As such, the processor 102 is configured to determine if the additional functions ("task tracking") (605) is present. If not, then the process 600 loops back. If so, then these additional functions are implemented. In particular, the processor 102, based on the aircraft mission data from the aircraft mission data sources 106, assesses the current and imminent task loading of each pilot 108, 112 (606), compares the cognitive state of each pilot 108, 112 (608), compares the current and imminent task loading of each pilot 108, 112 (612), and generates and displays task sharing recommendations to each pilot (614).

The system and method described herein objectively measures and compares the cognitive states of pilots, and may additionally recommend task sharing, and/or automate lower order tasks as necessary. The system and method acts as an objective, non-threatening third party that determines and communicates the cognitive state of each pilot. By acting as an "honest broker," the state assessment is better received and respected than if one crew member insinuates that another crew member is overloaded or drowsy. The system and method uses real time neurophysiology-based measures of workload and/or fatigue to compare the state of a two-person crew so that tasks can be delegated back and forth based on cognitive state.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist.

It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention.

What is claimed is:

1. A method for facilitating workload management, comprising the steps of:
   processing first sensor data to estimate current cognitive state of a first person;
   processing second sensor data to estimate current cognitive state of a second person;
   storing at least a portion of the estimates of the current cognitive state states of the first person and the second person in a memory storage device;
   simultaneously rendering, on a display device, information representative of (i) the estimates of the current cognitive states of the first person and the second person and (ii) at least a portion of the stored estimates of the current cognitive state states of the first person and the second person;
   processing aircraft mission data and the first sensor data to estimate both current and imminent task loading of the first person;
   processing the aircraft mission data and the second sensor data to estimate both current and imminent task loading of the second person;
   comparing the estimates of the current and imminent task loadings of the first and second persons;
   selectively generating task sharing recommendations based on the comparison of the estimates of the current and imminent task loadings; and
   rendering the selectively generated task sharing recommendations on the display device.

2. The method of claim 1, wherein the information representative of at least a portion of the stored estimates of the current cognitive states of the first person and the second person are rendered on the display device in a manner that depicts cognitive state histories of the first and second person over a predetermined period of time.

3. A flight crew workload management system, comprising:
   a display device configured to render images;
   a first plurality of workload sensors, each of the first plurality of workload sensors configured to (i) sense a parameter representative of first pilot workload level and (ii) supply first sensor data representative thereof;
   a second plurality of workload sensors, each of the second plurality of workload sensors configured to (i) sense a parameter representative of second pilot workload level and (ii) supply second sensor data representative thereof;
   an aircraft mission data source configured to supply data representative of current aircraft mission; and
   a processor in operable communication with the display device and coupled to receive the first sensor data, the second sensor data, and the aircraft mission data, the processor configured, upon receipt of these data, to:
      estimate current workload states of a first pilot and of a second pilot,
      estimate current task loads of the first and second pilots,
      estimate imminent task loading of the first pilot,
      compare the estimates of the current task loads of the first and second pilots,
      compare the estimates of the imminent task loading of the first and second pilots,
      selectively generate task sharing recommendations based on the comparison of the estimates of the current task loads and the comparison of the imminent task loadings, and
      command the display device to simultaneously render information representative of the estimates of the current workload states of the first pilot and the second pilot, and the selectively generated task sharing recommendations.

4. The system of claim 3, further comprising:
   a memory storage device in operable communication with the processor for storing at least a portion of the estimates of the current workload cognitive states of the first pilot and the second pilot,
   wherein the processor is further configured to command the display device to simultaneously render information representative of at least a portion of the stored estimates of the current cognitive states of the first pilot and the second pilot.

5. The system of claim 3, wherein the information representative of at least a portion of the stored estimates of the current cognitive states of the first pilot and the second pilot are rendered on the display device in a manner that depicts cognitive state histories of the first and second pilot over a predetermined period of time.

* * * * *

UNITED STATES PATENT AND TRADEMARK OFFICE
CERTIFICATE OF CORRECTION

PATENT NO. : 8,928,498 B2  Page 1 of 1
APPLICATION NO. : 13/173760
DATED : January 6, 2015
INVENTOR(S) : Dorneich et al.

It is certified that error appears in the above-identified patent and that said Letters Patent is hereby corrected as shown below:

In the claims:

Column 10, claim 4, line 35, "current workload cognitive states" should be changed to --current cognitive states--.

Signed and Sealed this
First Day of March, 2016

Michelle K. Lee
*Director of the United States Patent and Trademark Office*